No. 696,432. Patented Apr. 1, 1902.
G. R. HARVEY & E. A. WERNER.
PRESS FOR BALING COTTON OR ANALOGOUS MATERIALS.
(Application filed Mar. 23, 1901.)
(No Model.) 5 Sheets—Sheet 1.

No. 696,432. Patented Apr. 1, 1902.
G. R. HARVEY & E. A. WERNER.
PRESS FOR BALING COTTON OR ANALOGOUS MATERIALS.
(Application filed Mar. 23, 1901.)
(No Model.) 5 Sheets—Sheet 3.
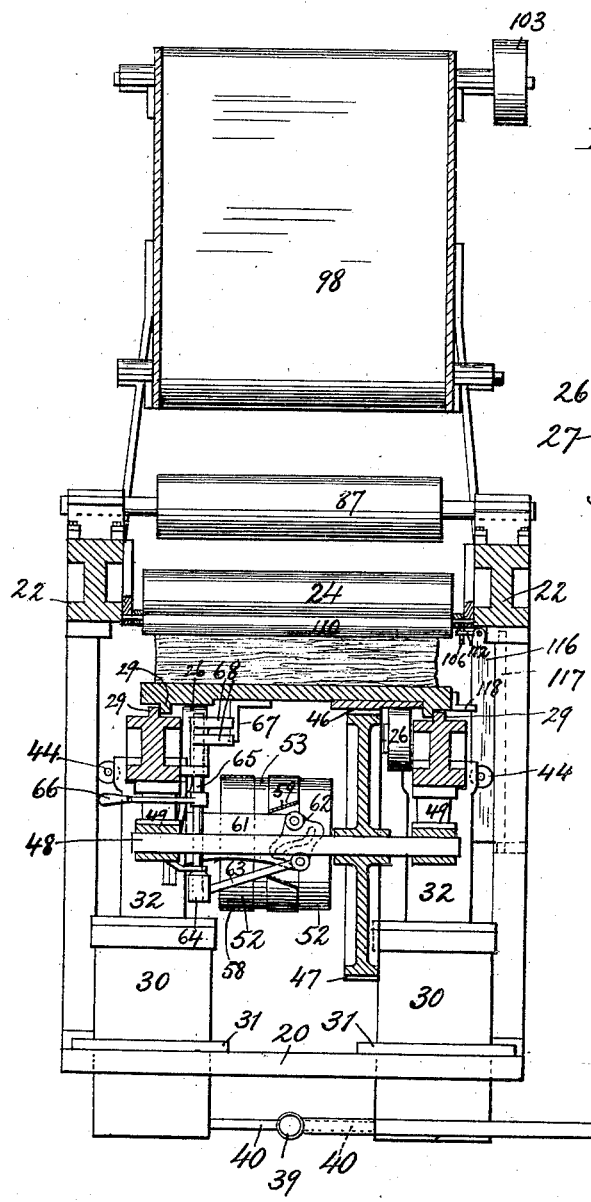
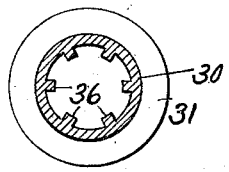
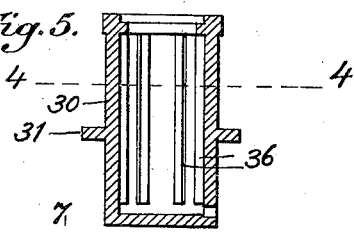
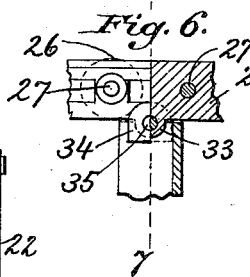
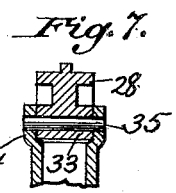
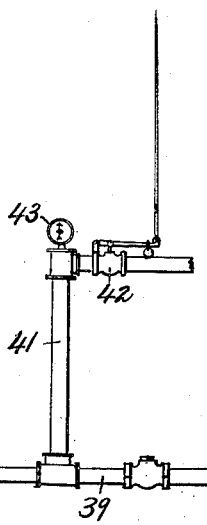
Witnesses
Inventors
George R. Harvey
Edward A. Werner
By Grant Burroughs Attorney No. 696,432. Patented Apr. 1, 1902.
G. R. HARVEY & E. A. WERNER.
PRESS FOR BALING COTTON OR ANALOGOUS MATERIALS.
(Application filed Mar. 23, 1901.)
(No Model.) 5 Sheets—Sheet 4.
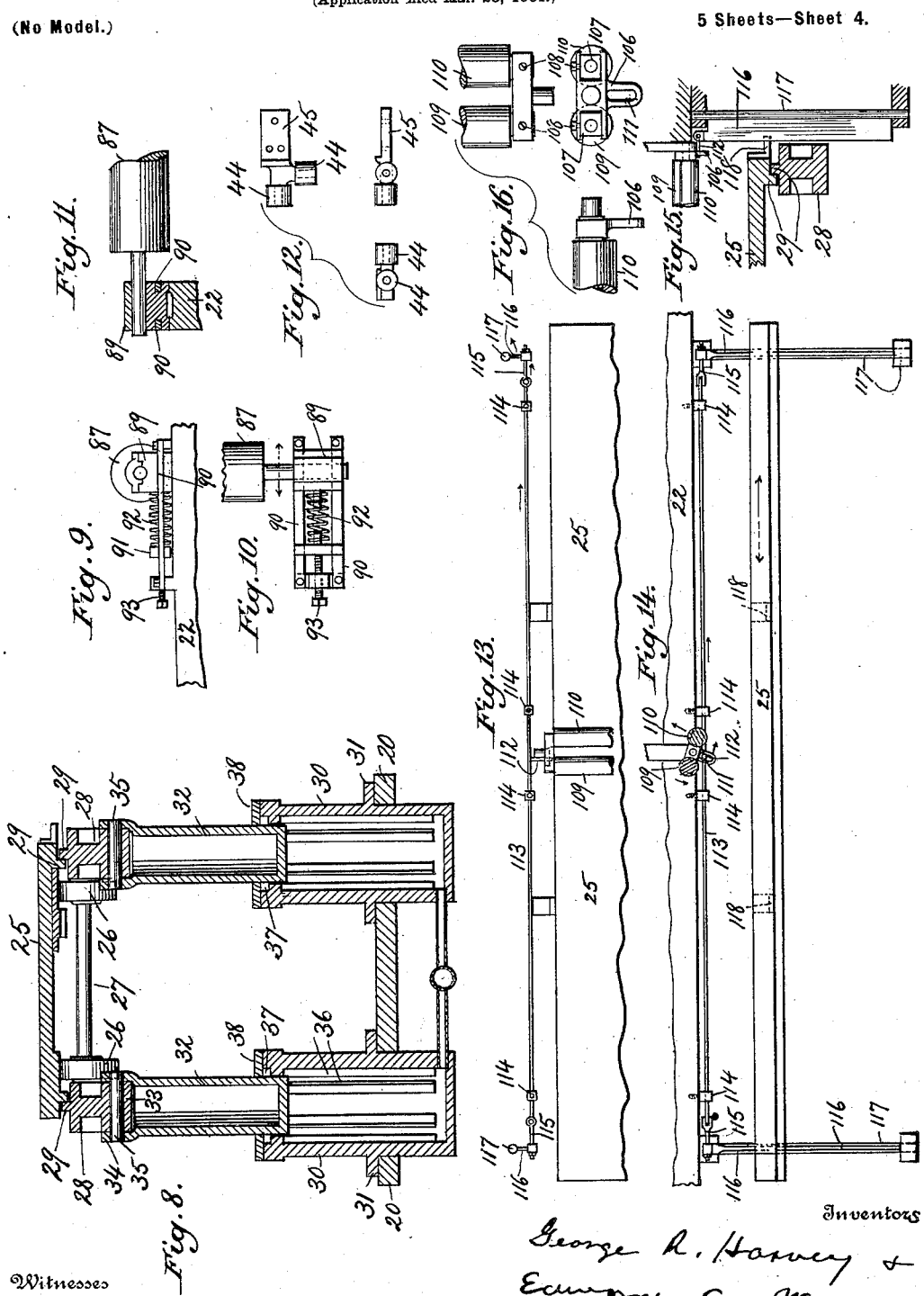
Witnesses
Inventors
George R. Harvey &
Edward A. Werner
By Grant Burroughs Attorney No. 696,432. Patented Apr. 1, 1902.
G. R. HARVEY & E. A. WERNER.
PRESS FOR BALING COTTON OR ANALOGOUS MATERIALS.
(Application filed Mar. 23, 1901.)

(No Model.) 5 Sheets—Sheet 5.

Witnesses
Inventors

UNITED STATES PATENT OFFICE.

GEORGE R. HARVEY, OF HAMILTON, CANADA, AND EDWARD A. WERNER, OF BIRMINGHAM, ALABAMA.

PRESS FOR BALING COTTON OR ANALOGOUS MATERIALS.

SPECIFICATION forming part of Letters Patent No. 696,432, dated April 1, 1902.

Application filed March 23, 1901. Serial No. 52,487. (No model.)

*To all whom it may concern:*

Be it known that we, GEORGE R. HARVEY, a citizen of Canada, and a resident of Hamilton, in the county of Wentworth, Province of Ontario, Dominion of Canada, and EDWARD A. WERNER, a citizen of the United States, and a resident of Birmingham, in the county of Jefferson and State of Alabama, have invented certain new and useful Improvements in Presses for Baling Cotton or Analogous Materials, of which the following is a full, clear, and exact description, such as will enable those skilled in the art to which it appertains to make and use the same, reference being had to the accompanying drawings, forming a part of this specification.

This invention relates to improvements in presses of that description which consist, primarily, of a fixed member having its pressure-surface formed of rolls and of a movable member carrying a reciprocal table forming its pressure-surface and between which members the material is introduced in layers and there compressed by force applied to the movable member.

The invention consists in the novel construction, combination, and arrangement of parts, such as will be hereinafter fully described, pointed out in the appended claims, and illustrated in the accompanying drawings.

Figure 1:
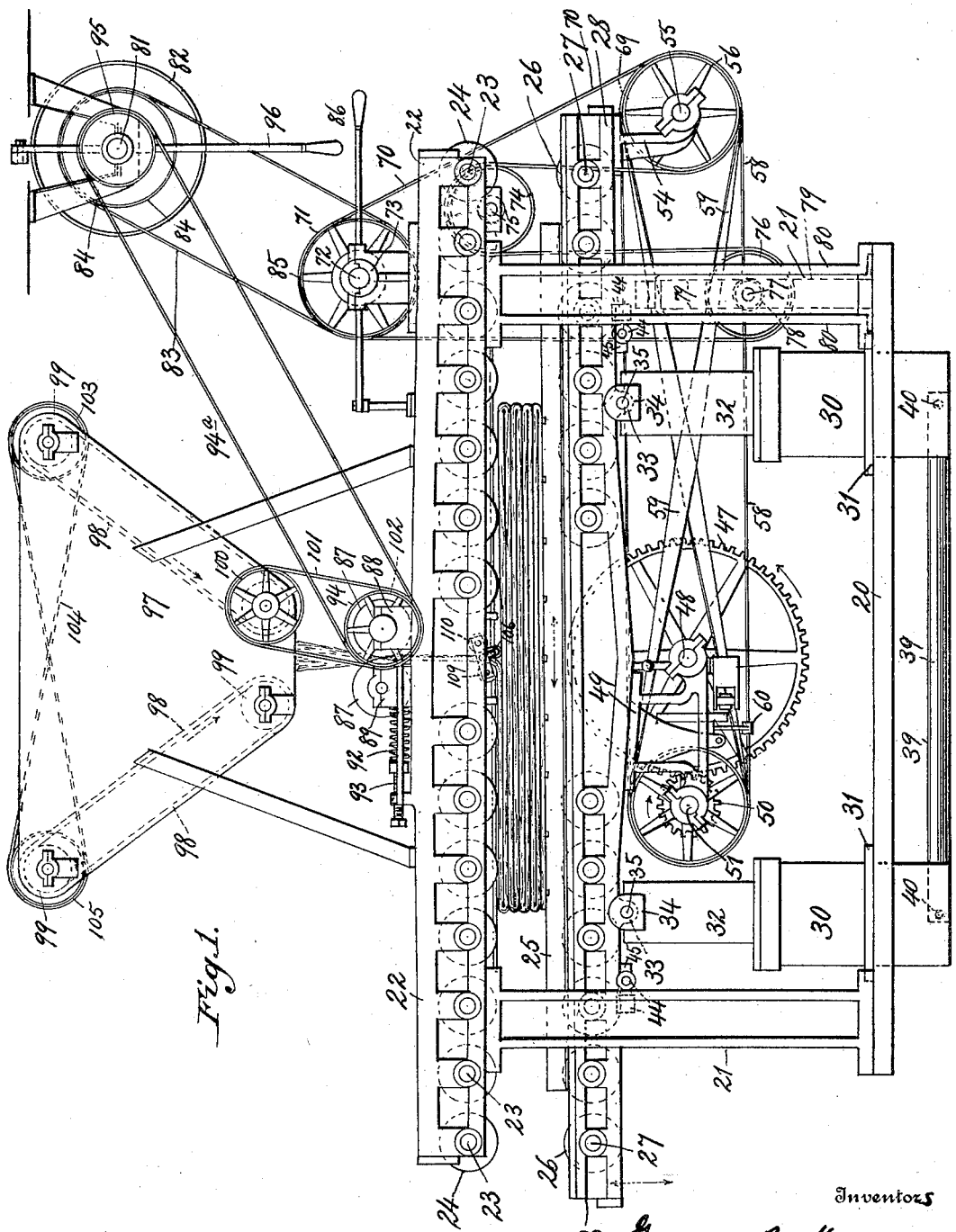
Figure 2:
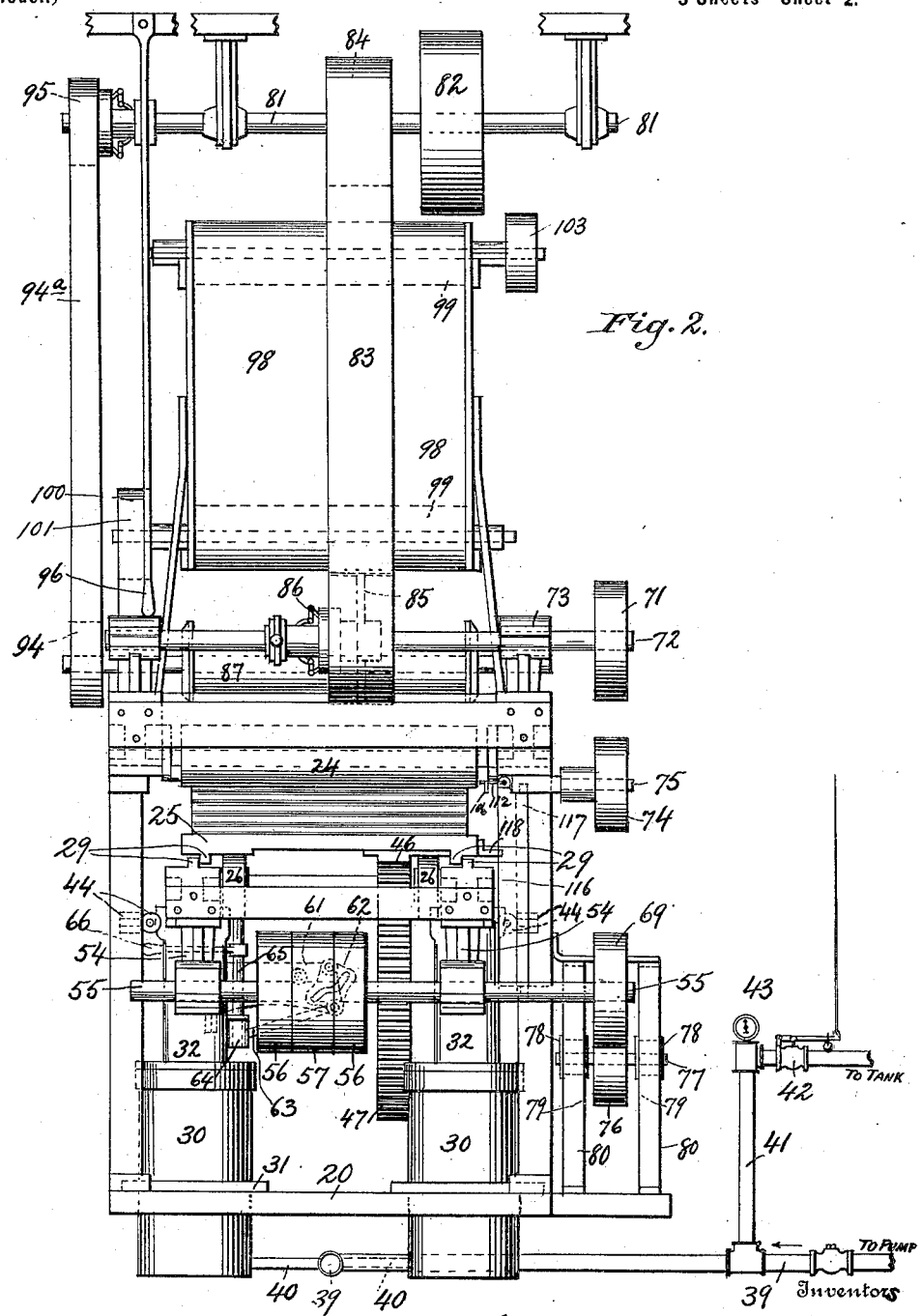
Figure 17:
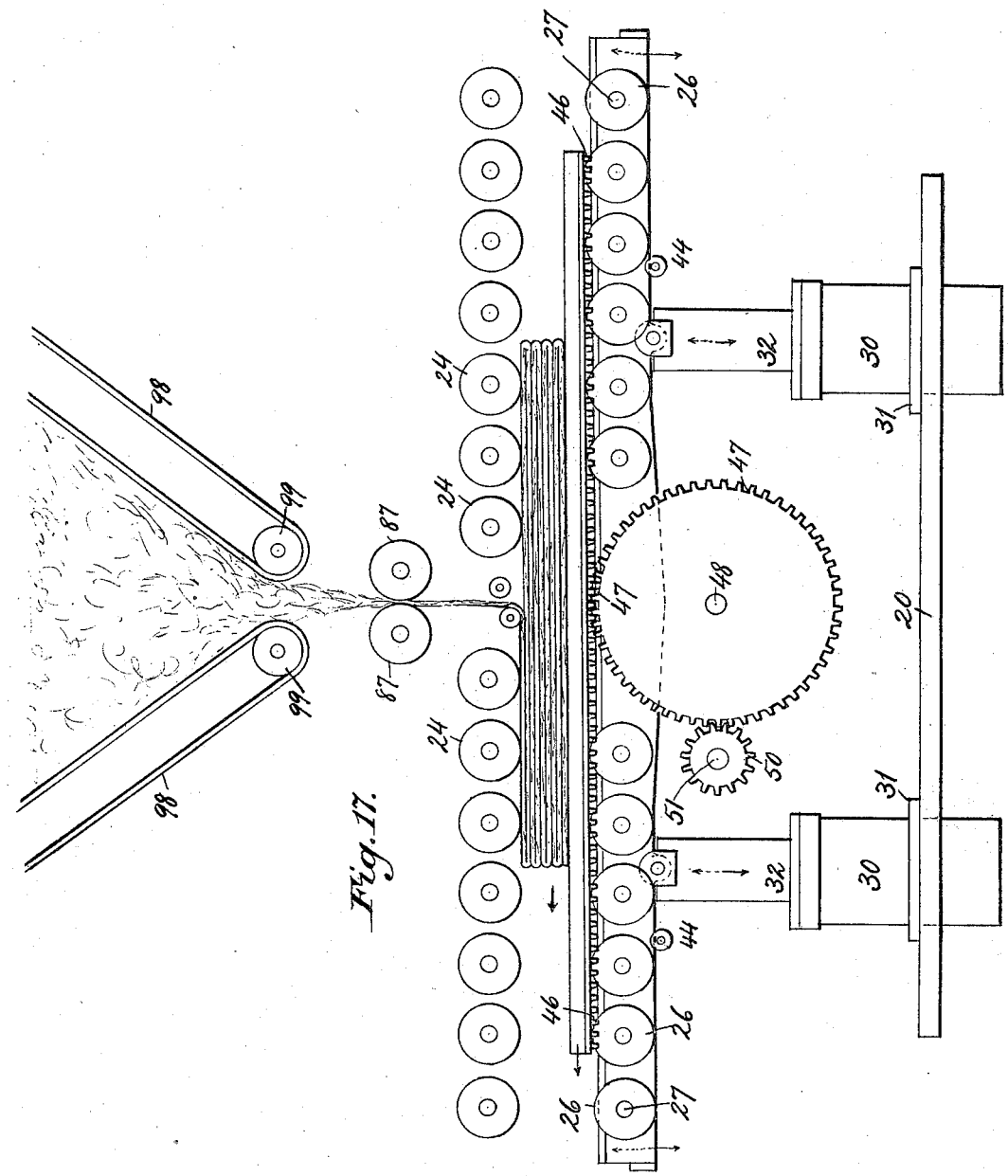

In the accompanying drawings, in which similar reference characters designate corresponding parts, Figure 1 is a side elevation of a cotton-press embodying the invention. Fig. 2 is an end elevation of the same. Fig. 3 is a transverse sectional view. Fig. 4 is a detail sectional view on the line 4 4 of Fig. 5. Fig. 5 is a vertical sectional view of one of the hydraulic lifts. Fig. 6 is a detail sectional view showing the pivotal connection between the piston of the hydraulic lift and the movable member of the press. Fig. 7 is a sectional view on the line 7 7 of Fig. 6. Fig. 8 is a detail sectional view showing the hydraulic lifts. Fig. 9 is an end view of one of the compressing-rolls and its movable bearing. Fig. 10 is a plan view of the same. Fig. 11 is a sectional view of the bearing. Fig. 12 is a detail view showing the guide-rolls for the movable member. Fig. 13 is a detail plan view, partly in section, showing the mechanism for moving the folding-rolls. Fig. 14 is a side elevation of the same. Fig. 15 is an end view of the same. Fig. 16 is an enlarged detail view showing the ends of the folding-rolls and their support. Fig. 17 is a diagrammatic view showing the more important parts of the press.

The base-plate 20 of the machine is generally rectangular in form and may be supported by a foundation of any construction suitable in the premises. On its corners are mounted the four columns 21, carrying at their upper ends the housing 22, consisting of two parallel side pieces extending longitudinally of the machine and suitably connected by cross-pieces. In this housing are journaled the shafts 23 of the rolls 24, forming the pressure-surface of the fixed upper member of the press. These rolls are fourteen or more in number and are arranged at regular intervals, except that the space between the two innermost is greater than the space between the others.

Beneath the fixed upper member of the press is the lower movable member. The latter consists of the table 25, carried by the rolls 26, having their shafts 27 journaled in the housing 28, consisting of two parallel sides suitably joined together. The table is movable back and forth on the rolls longitudinally of the housing and is guided thereon by the lugs or ribs 29, projecting from its under side and from the top of the housing. This table forms the pressure-surface of the movable member of the press. The movable lower member is carried by hydraulic lifts. In sockets in the base-plate 20 are mounted the cylinders 30, provided with flanges 31 to hold them in place. In the cylinders are the pistons 32, to the upper ends of which is pivoted the housing of the lower member. These pivotal connections consist of the lugs 33, projecting from the under side of the housing between the lugs 34 of the pistons, with the pins 35 passing through the same. (See Figs. 6, 7, and 8.) As there is some little play in these pivotal connections, the movable member can tilt to accommodate itself to the unevenness of the bale being produced. Owing to the tilting of the movable member there is a tendency of the pistons to bind in their cylinders. This is prevented by the vertical ribs 36, projecting from the inner faces of the cylinders. These ribs form bearings for the pistons and guide them in their movements. In the upper ends of the cylinders are the annular recesses 37, in which packing is placed around the pistons to prevent leakage. The packing is held in place by the annular plates 38. When the pistons are elevated, the annular plates can be raised and the packing can be readily renewed when necessary. Means are provided for introducing fluid under pressure into the cylinders 30. A supply-pipe 39 leads from a suitable pump and is connected with the cylinders by the branch pipes 40. Connected with the supply-pipe intermediate of the pump and the branch pipes is the relief-pipe 41, controlled by the valve 42 and is provided with the pressure-gage 43. By regulating the supply and pressure of the fluid introduced into the cylinders the force exerted by the members of the press can be controlled. When the pressure passes a predetermined point, the relief-valve 42 opens and allows the fluid to escape until the pressure drops to that point again, when the valve closes. The relief-valve can also be operated by hand to permit the escape of the water to lower the movable member. As the movable member is moved up and down it is guided by the friction-rolls 44, journaled on the brackets 45, secured to the housing of the movable member. These rolls bear against the columns 21 and cause the movable member to travel in the proper vertical path. (See Fig. 12.)

Mechanism is provided for reciprocating the table 25 of the movable lower member. To the under side of the member is secured the rack 46, extending longitudinally of the same. With this rack engages the gear-wheel 47, mounted on the shaft 48, journaled in the hangers 49, secured to the under side of the housing 28. This gear is rotated by the pinion 50 on the shaft 51, also journaled in the hangers 49. On the shaft 51 are the loose pulleys 52 and the fixed pulley 53 between them. In brackets 54, secured to the under side of the housing 28, at one end of the same, is journaled the shaft 55, and on the latter are the loose pulleys 56 and the fixed pulley 57 between them. Straight and cross belts 58 and 59, respectively, connect the pulleys on the shaft 55 with the pulleys on the shaft 51. By means of the belt-shifter cam 62 either one of the belts can be moved onto the fixed pulleys and the table thereby through the intervening mechanism moved in one direction or the other. The belt-shifter is carried between the belts by the plate 61, secured to one of the hangers 49. It is moved by the cam 62, pivoted to the plate. The cam is connected by the link 63 with crank 64 on the shaft 65, journaled in suitable bearings carried by the bracket 49, to which the plate is attached. The shaft is rotated by the hand-lever 66. Lugs 67, carried by the table 25, are adapted to engage with the arms 68 on the shaft to automatically turn the latter when the table reaches the end of a stroke to operate the belt-shifter By this means the belts can be shifted automatically to reciprocate the table.

The shaft 55, on which are the pulleys 56 and 57, is driven by the pulley 69, over which passes the belt 70. The latter is driven by the pulley 71 on the shaft 72, journaled in bearings 73, mounted on the housing 22 of the upper member. As the pulleys 69 and 71 are relatively movable, means must be provided for keeping the belt taut. The latter passes over the idler-pulley 74, journaled on the spindle 75, secured to the housing 22 of the fixed member of the press. The belt also passes around the movable pulley 76 on the shaft 77, carried by the loose grooved rollers 78, working in the guideways 79 of the brackets 80. As the distance between the pulleys 69 and 71 varies the belt is kept taut by the roller 76 riding in a bight in the same. Motion is conveyed to the shaft 72 from the main driving-shaft 81, which is driven by the pulley 82, by the belt 83, passing over the pulley 84 on the main driving-shaft and around the loose pulley 85 on the said shaft 72. A clutch mechanism 86 for connecting the pulley 85 with the shaft 72 is provided.

On the housing 22 of the fixed member are mounted the compressing-rolls 87 directly above the space between the two innermost rolls 24. These rolls serve to compress the bat of material after it leaves the hopper, so that it can be more readily handled by the succeeding mechanisms in introducing and folding it between the members of the press. They also give to the material its first compression. The shaft of one of these rolls is journaled in the fixed bearings 88, and the shaft of the other one is journaled in the movable bearings 89. The movable bearings are adjustable relatively to the fixed bearings and each is held on the housing 22 by the rods 90, which form a guideway. (See Figs. 9, 10, and 11.) Adjustable on the rods 90 is the block 91, and interposed between the latter and the bearing is the spring 92, normally pressing the movable bearing toward the fixed one. By means of the screw 93 the block can be adjusted to regulate the tension of the spring, and consequently the pressure that will be exerted by the rolls. On the shaft of the roll journaled in the fixed bearings is the pulley 94, driven by the belt 94ᵃ, passing over the loose pulley 95 on the main driving-shaft 81. A clutch mechanism operated by the lever 96 is provided for connecting the pulley with the shaft.

Above the compressing-rolls 87 is the hopper 97, supported on the housing 22 of the fixed member of the press. The inclined sides of the hopper are formed of endless aprons 98, carried by the rollers 99. On the shaft of one of the lower rollers is the pulley 100, connected by the belt 101 with the pulley 102 on the shaft of the fixed compressing-roll 87. The rotation of this lower roller imparts motion to the apron carried by it, and motion is thereby imparted to the upper roller on the same side of the hopper. On the shaft of this upper roller is the pulley 103, connected by the cross-belt 104 with the pulley 105 of the upper roller 99 on the opposite side of the hopper. When the compressing-rolls 87 are set in motion, the aprons are also set in motion, and the latter serve to convey the cotton to the lower end of the hopper and to eject it from the same in the form of a loose bat.

Beneath the compressing-rolls 87 and in the space between the innermost rolls of the series 24 is located the mechanism for folding the bat in successive layers upon the table 25. To the housing 22 are pivoted the brackets 106. (See Fig. 16.) In each of these brackets are adjustable bearing-blocks 107, which are held in place by the screws 108. In these bearing-blocks are journaled the shafts of the folding-rolls 109 and 110. By adjusting the bearing-blocks relatively to each other the rolls can be adjusted to accommodate bats of different thicknesses. One of the brackets 106 has a slotted arm 111, with which engages the pin 112 on the rod 113. (See Figs. 13, 14, and 15.) This rod is supported beneath the housing 22 by the eyebolts 114, in which it can move back and forth. It is connected at its ends by the links 115 with the plates 116, carried by the rods 117, pivoted in the frame of the machine. The positions of these plates are such that they will be engaged and turned by the lugs 118, secured to the side of the table 25. The length of the plates is such that no matter what the elevation of the table may be they will be struck when the table reaches the end of one stroke or the other. By this mechanism the rolls 104 and 105 are moved to bring one or the other in position to fold the bat at the proper point, so that the layers will all be of an equal length and so that their ends will be in the same plane.

The operation of forming a bale is as follows: The bagging to cover the lower side of the bale is first placed on the table 25 and fastened at the sides by suitable clips. The pump is started, and through the hydraulic lifts the movable member is raised until its table is in contact with the rolls 24, forming the pressure-surface of the fixed member. The operation of the pump is continued until the gage connected with the relief-pipe 41 shows the required pressure at which the machine will be operated. The clutch 86 by its lever is then operated to connect the pulley 85 with the shaft 82, and the belt-shifter 60 by the lever 66 and the intervening mechanism is moved to place one or the other of the belts 58 or 59 onto the fixed pulleys 53 and 57, and the table thereby moved to its initial position. Then through the clutch mechanism, operated by the lever 96, the compressing-rolls 87 and the aprons 98 are set in motion. The cotton is fed from the hopper in the form of a loose bat to the rolls 87, when it is given its initial compression. Then the bat passes between the folding-rolls 104 and 105 onto the table 25. As the table is moved back and forth the bat is folded upon itself and the bale built up in layers until it reaches the required thickness. While the bale is being built up by the addition of layers of the bat it is being compressed between the two members of the press. As the bale increases in size the lower member gradually drops, owing to the action of the valve in the relief-pipe 41. After the bale has been formed the operation of the machine is stopped, and throwing the belt-shifter lever 66 the table is moved to the extreme left of the machine and the bagging for the top of the bale is placed on the other end of the table. Then the table is moved to the opposite end of the machine, and the bagging is drawn between the innermost of the rolls 24 over the bale as it moves to the right. The bale is then moved to a central position and ties are passed through slots in the face of the table and over the top of the bale and secured. The valve in the relief-pipe is opened and the fluid permitted to escape from the lifts and the movable member lowered for the discharge of the bale.

It is to be observed that while in the process of formation it will only have a uniform thickness at the end of each stroke. After a portion of a layer has been placed that part of the bale covered by it will be thicker than the other. This will have a tendency to tilt the movable member. Owing to the pivotal connections between the movable member and the pistons of the lifts the table can tilt to the required extent without causing a binding of the operative parts.

Having thus described our invention, what we claim, and desire to secure by Letters Patent, is—

1. In a press, a fixed member having rolls forming its pressure-surface, a vertically-movable member coöperating with said fixed member, a reciprocal table carried by said vertically-movable member and forming the pressure-surface for the same, means for reciprocating said table, means for forming the material to be compressed into a bat, and a folding mechanism carried by said fixed member and means actuated by the movement of said table carried by the vertically-movable member for depositing the bat in layers upon said reciprocal table between the pressure-surfaces of said fixed and movable members.

2. In a press, a fixed member having rolls forming its pressure-surface, a vertically-movable member coöperating with said fixed member and adapted to being tilted, lifts for moving said vertically-movable member and having pivotal connections with the same to permit the tilting, a reciprocal table carried by said vertically-movable member and forming the pressure-surface for the same, means for reciprocating said table, means for forming the material to be compressed into a bat, and a folding mechanism carried by said fixed member and means actuated by the movement of said table carried by the vertically-movable member for depositing the bat in layers upon said table between the pressure-surfaces of said fixed and movable members.

3. In a press, a fixed member having rolls forming its pressure-surface, a vertically-movable member coöperating with said fixed member and adapted to being tilted, lifts for moving said vertically-movable member and having pivotal connections with the same to permit the tilting, a reciprocal table carried by said vertically-movable member and forming the pressure-surface for the same, means for reciprocating said table, a hopper for receiving the material to be compressed, converging endless aprons for conveying the material out of said hopper and forming it into a bat, compressing-rolls for receiving the bat as it leaves the hopper, and a folding mechanism carried by said fixed member and means actuated by the movement of said table carried by the vertically-movable member for depositing the bat in layers upon said table between the pressure-surfaces of said fixed and movable members.

4. In a press, a fixed member having rolls forming its pressure-surface, a vertically-movable member coöperating with said fixed member and adapted to being tilted, cylinders provided with longitudinal internal ribs, pistons pivotally connected with said movable member and movable in said cylinders and bearing against said ribs, means for introducing fluid under pressure into said cylinders, a reciprocal table carried by said vertically-movable member and forming the pressure-surface for the same, means for reciprocating said table, means for forming the material to be compressed into a bat, and a folding mechanism carried by said fixed member and means actuated by the movement of said table carried by the vertically-movable member for depositing the bat in layers upon said table between the pressure-surfaces of said fixed and movable members.

5. In a press, a base-plate provided with sockets, columns mounted on said base-plate, a fixed member secured to said columns and having rolls forming its pressure-surface, a vertically-movable member coöperating with said fixed member and adapted to being tilted, flanged cylinders seated in said sockets, pistons movable in said cylinders and pivotally connected with said vertically-movable member, means for introducing fluid under pressure into said cylinders, a reciprocal table carried by said vertically-movable member and forming the pressure-surface for the same, means for reciprocating said table, means for forming the material to be compressed into a bat, and a folding mechanism carried by said fixed member and means actuated by the movement of said table carried by the vertically-movable member for depositing the bat in layers upon said table between the pressure-surfaces of said fixed and movable members.

6. In a press, a base-plate provided with sockets, columns mounted on said base-plate, a fixed member secured to said columns and having rolls forming its pressure-surface, a vertically-movable member coöperating with said fixed member and adapted to being tilted, brackets secured to said movable member, friction-rolls journaled on said brackets and bearing against said columns, flanged cylinders seated in said sockets and having longitudinal internal ribs, pistons movable in said cylinders and bearing against said ribs and pivotally connected with said movable member, means for introducing fluid under pressure into said cylinders, a reciprocal table carried by said vertically-movable member and forming the pressure-surface for the same, means for reciprocating said table, means for forming the material to be compressed into a bat, and a folding mechanism carried by said fixed member and means actuated by the movement of said table carried by the vertically-movable member for depositing the bat in layers upon said table between the pressure-surfaces of said fixed and movable members.

7. In a press, relatively movable compressing members, a reciprocal table carried by one of said members, pivoted brackets, folding-rolls carried by said brackets, and a hinged plate connected with said brackets and mounted in the path of travel of said table to be struck by the same and thereby oscillate said brackets.

8. In a press, a fixed member, a movable member coöperating with said fixed member, a reciprocal table carried by said movable member, pivoted brackets, folding-rolls carried by said brackets, and a hinged plate connected with said brackets and mounted in the path of travel of said table to be struck by the same and thereby oscillate said brackets.

9. In a press, relatively movable compressing members, a reciprocal table carried by one of said members, pivoted brackets, folding-rolls carried by said brackets, a hinged plate mounted in the path of travel of said table to be struck by the same, and a rod connecting said plate with said brackets.

10. In a press, relatively movable compressing members, a reciprocal table carried by one of said members, pivoted brackets, folding-rolls carried by said brackets, a hinged plate mounted in the path of travel of said plate to be struck by the same, a rod connected with said bracket, and a link connecting said rod with the free end of said plate.

11. In a press, relatively movable compressing members, a reciprocal table carried by one of said members, a pivoted bracket provided with a slotted arm, folding-rolls journaled in said bracket, a rod carrying a pin engaging with the slotted arm of said bracket, a hinged plate mounted in the path of travel of said table to be struck by the same, and a link connecting said rod with the free end of said plate.

12. In a press, relatively movable compressing members, a reciprocal table carried by one of said members, pivoted brackets, relatively adjustable folding-rolls carried by said brackets, a hinged plate mounted in the path of travel of said table to be struck by the same, and a rod connecting said plate with said brackets.

13. In a press, relatively movable compressing members, a reciprocal table carried by one of said members, a pivoted bracket provided with a slotted arm, relatively adjustable bearing-blocks placed in said bracket, folding-rolls having their shafts journaled in said bearing-blocks, a hinged plate adapted to be struck by said table, a rod having a pin engaging with the slotted arm of said bracket, and a link connecting said rod with the free end of said plate.

14. In a press, a fixed member, a movable member, means for moving said movable member to and from said fixed member, a reciprocal table carried by said movable member, means for moving said table back and forth on said movable member, an elongated hinged plate extending parallel with the line of movement of said movable member to and from said fixed member and mounted in the path of travel of said table to be struck by the same and thereby oscillated, and a folding mechanism operated by said plate.

15. In a press, a fixed member, a movable member, means for moving said movable member to and from said fixed member, a reciprocal table carried by said movable member, means for moving said table back and forth on said movable member, an elongated hinged plate extending parallel with the line of movement of said movable member to and from the fixed member and mounted in the path of travel of said table to be struck by the same and thereby oscillated, brackets pivoted to said fixed member, folding-rolls carried by said brackets, and means for connecting said plate to said brackets to convey motion from one to the other.

16. In a press, a fixed member, a movable member, means for moving said movable member to and from said fixed member, a reciprocal table carried by said movable member, means for moving said table back and forth on said movable member, an elongated hinged plate extending parallel with the line of movement of said movable member to and from the fixed member and mounted in the path of travel of said table to be struck by the same and thereby oscillated, brackets pivoted to said fixed member, relatively adjustable folding-rolls carried by said brackets, and a rod connecting said plate with said brackets to convey motion from one to the other.

17. In a press, a fixed member, a movable member, means for moving said movable member to and from said fixed member, a reciprocal table carried by said movable member, means for reciprocating said table, brackets pivoted to said fixed member, folding-rolls carried by said brackets, a rod connected with said brackets, and pivoted plates connected with said brackets and mounted in the path of travel of said table so as to be struck by the same at the end of a stroke and moved thereby to oscillate the brackets carrying the folding-rolls.

18. In a press, a fixed member, a movable member, means for moving the latter to and from said fixed member, a reciprocal table carried by said movable member, means for reciprocating said table back and forth on said movable member, folding mechanism for depositing the material to be compressed in layers between said members, and operative mechanism connected with said folding mechanism and mounted parallel with the line of movement of said movable member to and from the fixed member and in the path of travel of said table to be put in motion by the same.

19. In a press, a fixed member having rolls forming its pressure-surface, a movable member, means for moving the latter to and from said fixed member, a reciprocal table carried by said movable member and forming the pressure-surface for the same, means for reciprocating said table back and forth on said movable member, means for forming the material to be compressed into a bat, a folding mechanism carried by said fixed member for depositing the bat in layers between the pressure-surfaces of the fixed and movable members, and operative mechanism connected with said folding mechanism and mounted parallel with the line of movement of the movable member to and from the fixed member and in the path of travel of said table to be put in motion by the latter.

20. In a press, a fixed member having rolls forming its pressure-surface, a movable member, means for moving the latter to and from said fixed member, a reciprocal table carried by said movable member and forming the pressure-surface for the same, means for reciprocating said table back and forth on said movable member, a hopper for receiving the material to be compressed, converging endless aprons for conveying the material out of said hopper and forming it into a bat, compressing-rolls for receiving the bat as it leaves the hopper, a folding mechanism carried by said fixed member for depositing the bat in layers between the pressure-surfaces of the fixed and movable members, and operative mechanism connected with said folding mechanism and mounted parallel with the line of movement of the movable member to and from the fixed member and in the path of travel of said table to be put in motion by the latter.

21. In a press, a fixed member, a movable member adapted to be tilted, means for moving said movable member to and from said fixed member, a reciprocal table carried by said movable member, means for reciprocating said table back and forth on said movable member, folding mechanism for depositing the material to be compressed in layers between said members, and operative mechanism connected with said folding mechanism and mounted parallel with the line of movement of the movable member to and from the fixed member and in the path of travel of said table to be put in motion by the latter.

22. In a press, a fixed member, a movable member adapted to being tilted, cylinders provided with longitudinal internal ribs, pistons movable in said cylinders and bearing against said ribs and pivotally connected with said movable member, a reciprocal table carried by said movable member, means for reciprocating said table back and forth on said movable member, folding mechanism for depositing the material to be compressed in layers between said members, and operative mechanism connected with said folding mechanism and mounted parallel with the line of movement of the movable member to and from the fixed member and in the path of travel of said table to be put in operation by the latter.

23. In a press, a base-plate provided with sockets, columns mounted on said base-plate, a fixed member secured to said columns, a movable member adapted to being-tilted, guides carried by said movable member and bearing against said columns, flanged cylinders seated in said sockets and provided with longitudinal internal ribs, pistons movable in said cylinders and bearing against said ribs and pivotally connected with said movable member, a reciprocal table carried by said movable member, means for reciprocating said table back and forth on said movable member, folding mechanism for depositing the material to be compressed between said members in layers, and operative mechanism connected with said folding mechanism and mounted parallel with the line of movement of the movable member to and from the fixed member and in the path of travel of said table to be put in operation by the latter.

24. In a press, a fixed member having rolls forming its pressure-surface, a movable member, means for moving the latter to and from said fixed member, a reciprocal table carried by said movable member and forming the pressure-surface for the same, means for reciprocating said table back and forth on said movable member, a hopper for receiving the material to be compressed, converging endless aprons for conveying the material out of said hopper and forming it into a bat, compressing-rolls for receiving the bat as it leaves the hopper, a folding mechanism for depositing the bat in layers between the pressure-surfaces of the fixed and movable members, and a hinged plate connected with said folding mechanism mounted parallel with the line of movement of the movable member to and from the fixed member and in the path of travel of said table to be struck by the latter and thereby operate said folding mechanism.

25. In a press, a fixed member, a movable member adapted to being tilted, means for moving said movable member to and from said fixed member, a reciprocal table carried by said movable member, means for reciprocating said table back and forth on said movable member, folding mechanism for depositing the material to be compressed in layers between said members, and a hinged plate connected with said folding mechanism mounted parallel with the line of movement of said movable member to and from the fixed member and in the path of travel of said table to be struck by the latter and thereby operate said folding mechanism.

26. In a press, a fixed member, a movable member adapted to being tilted, cylinders provided with longitudinal internal ribs, pistons movable in said cylinders and bearing against said ribs and pivotally connected with said movable member, a reciprocal table carried by said movable member, means for reciprocating said table back and forth on said movable member, folding mechanism for depositing the material to be compressed in layers between said members, and a hinged plate connected with said folding mechanism mounted parallel with the line of movement of the movable member to and from the fixed member and in the path of travel of said table to be struck by the latter and thereby operate said folding mechanism.

27. In a press, a base-plate provided with sockets, columns mounted on said base-plate, a fixed member secured to said columns, a movable member adapted to being tilted, guides carried by said movable member and bearing against said columns, flanged cylinders seated in said sockets and provided with longitudinal internal ribs, pistons movable in said cylinders and bearing against said ribs and pivotally connected with said movable member, a reciprocal table carried by said movable member, means for reciprocating said table back and forth on said movable member, folding mechanism for depositing the material to be compressed in layers between said members, and a hinged plate connected with said folding mechanism mounted parallel with the line of movement of the movable member to and from the fixed member and in the path of travel of said table to be struck by the latter and thereby operate said folding mechanism.

28. In a press, a fixed member having rolls forming its pressure-surface, a vertically-movable member coöperating with said fixed member, a reciprocal table carried by said vertically-movable member and forming the pressure-surface for the same, means for reciprocating said table, means for forming the material to be compressed into a bat, a folding mechanism carried by said fixed member for depositing the bat in layers upon said reciprocal table between the pressure-surfaces of said fixed and movable members, and a hinged plate connected with said folding mechanism mounted parallel with the line of movement of the movable member to and from the fixed member and in the path of travel of said table to be struck by the latter and thereby operate said folding mechanism.

29. In a press, a fixed member having rolls forming its pressure-surface, a vertically-movable member coöperating with said fixed member and adapted to being tilted, lifts for moving said vertically-movable member and having pivotal connections with the same to permit its tilting, a reciprocal table carried by said vertically-movable member and forming the pressure-surface for the same, means for reciprocating said table back and forth on said movable member, means for forming the material to be compressed into a bat, a folding mechanism carried by said fixed member for depositing the bat in layers upon said table between the pressure-surfaces of said fixed and movable members, and a hinged plate connected with said folding mechanism mounted parallel with the line of movement of the movable member to and from the fixed member and in the path of travel of said table to be struck by the latter and thereby operate said folding mechanism.

30. In a press, a fixed member having rolls forming its pressure-surface, a vertically-movable member coöperating with said fixed member and adapted to being tilted, lifts for moving said vertically-movable member and having pivotal connections with the same to permit its tilting, a reciprocal table carried by said vertically-movable member and forming the pressure-surface for the same, means for reciprocating said table back and forth on said movable member, a hopper for receiving the material to be compressed, converging endless aprons for conveying the material out of the hopper and forming it into a bat, compressing-rolls for receiving the bat as it leaves the hopper, a folding mechanism for depositing the bat in layers upon said table between the pressure-surfaces of said fixed and movable members, and a hinged plate connected with said folding mechanism mounted parallel with the line of movement of the movable member to and from the fixed member and in the path of travel of said table to be struck by the latter and thereby operate said folding mechanism.

31. In a press, a fixed member having rolls forming its pressure-surface, a vertically-movable member coöperating with said fixed member and adapted to being tilted, cylinders provided with longitudinal internal ribs, pistons pivotally connected with said movable member and movable in said cylinders and bearing against said ribs, means for introducing a fluid under pressure into said cylinders, a reciprocal table carried by said vertically-movable member and forming the pressure-surface for the same, means for reciprocating said table back and forth on said movable member, means for forming the material to be compressed into a bat, a folding mechanism carried by said fixed member for depositing the bat in layers upon said table between the pressure-surfaces of said fixed and movable members, and a hinged plate connected with said folding mechanism mounted parallel with the line of movement of the movable member to and from the fixed member and in the path of travel of said table to be struck by the latter and thereby operate said folding mechanism.

32. In a press, a base-plate provided with sockets, columns mounted on said base-plate, a fixed member secured to said columns and having rolls forming its pressure-surface, a vertically-movable member coöperating with said fixed member and adapted to being tilted, flanged cylinders seated in said sockets, pistons movable in said cylinders and pivotally connected with said vertically-movable member, means for introducing fluid under pressure into said cylinders, a reciprocal table carried by said vertically-movable member and forming the pressure-surface for the same, means for reciprocating said table back and forth on said movable member, means for forming the material to be compressed into a bat, a folding mechanism carried by said fixed member for depositing the bat in layers upon said table between the pressure-surfaces of said fixed and movable members, and a hinged plate connected with said folding mechanism mounted parallel with the line of movement of said movable member to and from the fixed member and in the path of travel of said table to be struck by the latter and thereby operate said folding mechanism.

33. In a press, a base-plate provided with sockets, columns mounted on said base-plate, a fixed member secured to said columns and having rolls forming its pressure-surface, a vertically-movable member coöperating with said fixed member and adapted to being tilted, brackets secured to said movable member, friction-rolls journaled on said brackets and bearing against said columns, flanged cylinders seated in said sockets and having longitudinal internal ribs, pistons movable in said cylinders and bearing against said ribs and pivotally connected with said movable member, means for introducing fluid under pressure into said cylinders, a reciprocal table carried by said vertically-movable member and forming the pressure-surface for the same, means for reciprocating said table back and forth on said movable member, means for forming the material to be compressed into a bat, a folding mechanism carried by said fixed member for depositing the bat in layers upon said table between the pressure-surfaces of said members, and a hinged plate connected with said folding mechanism mounted parallel with the line of movement of the movable member to and from the fixed member and in the path of travel of said table to be struck by the latter and thereby operate said folding mechanism.

In testimony whereof we hereunto affix our signatures in the presence of two witnesses.

GEO. R. HARVEY.
    E. A. WERNER.

Witnesses for George R. Harvey:
 JOHN HARVEY,
 HARRY BEST.

Witnesses for Edward A. Werner:
 JAMES J. GARRETT,
 PAULINE P. GRAHAM.